United States Patent [19]

Kuhl

[11] Patent Number: 4,499,623
[45] Date of Patent: Feb. 19, 1985

[54] EGG CLEANING APPARATUS

[75] Inventor: Jeffrey B. Kuhl, Flemington, N.J.

[73] Assignee: Henry Y. Kuhl, Flemington, N.J.

[21] Appl. No.: 572,715

[22] Filed: Jan. 20, 1984

[51] Int. Cl.³ ............................................. A01K 43/00
[52] U.S. Cl. ..................................... 15/3.13; 15/3.17; 15/77
[58] Field of Search ........... 15/3.13, 3.14, 3.15, 15/3.16, 3.17, 3.12, 77

[56] References Cited

U.S. PATENT DOCUMENTS

| | | |
|---|---|---|
| 1,074,940 | 10/1913 | Freer . |
| 1,113,190 | 10/1914 | Brandt . |
| 1,205,117 | 11/1916 | Stamm . |
| 1,423,059 | 7/1922 | Williamson . |
| 1,542,347 | 6/1925 | McClullough . |
| 1,723,441 | 8/1929 | Richards ............................. 15/3.16 |
| 1,777,039 | 9/1930 | Hatch . |
| 1,780,924 | 11/1930 | Ingraham . |
| 1,955,749 | 4/1934 | Jones . |
| 1,964,275 | 6/1934 | Secondo . |
| 2,035,587 | 3/1936 | Brandenburg ....................... 15/3.17 |
| 2,179,474 | 11/1939 | Stebler ................................. 15/3.17 |
| 2,183,033 | 12/1939 | Segrin ................................. 15/3.16 |
| 2,199,831 | 5/1940 | Cunning . |
| 2,301,931 | 11/1942 | Davis . |
| 2,371,867 | 3/1945 | Bayles . |
| 2,412,565 | 12/1946 | Davis ................................... 15/3.15 |
| 2,442,475 | 6/1948 | Swanson .............................. 15/3.14 |
| 2,538,331 | 1/1951 | Ruzsicska ............................. 15/3.14 |
| 2,587,730 | 3/1952 | Hutchinson et al. ................. 15/3.12 |
| 2,588,787 | 3/1952 | Wright ............................. 15/3.13 X |
| 2,632,901 | 3/1953 | Markusen et al. .................... 15/3.12 |
| 2,640,209 | 6/1953 | Johnson ................................ 15/3.12 |
| 2,673,361 | 3/1954 | McCutchan ......................... 15/3.15 |
| 2,979,746 | 4/1961 | Willsey ................................ 15/3.13 |
| 3,049,135 | 8/1962 | Kuhl et al. ............................. 134/72 |
| 3,099,848 | 8/1963 | Mountz ............................... 15/3.14 |
| 3,203,435 | 8/1965 | Kurtz .................................. 15/3.13 |
| 3,252,607 | 5/1966 | Rose et al. ........................... 15/3.13 |
| 3,349,419 | 10/1967 | Kuhl et al. ........................... 15/3.13 |
| 3,360,817 | 1/1968 | Halverson ........................... 15/3.13 |
| 3,392,414 | 7/1968 | Cathcart .............................. 15/3.13 |
| 3,909,290 | 9/1975 | Peppler et al. .................. 15/3.14 X |

FOREIGN PATENT DOCUMENTS

| | | | |
|---|---|---|---|
| 758340 | 1/1931 | France ................................ 15/3.16 |
| 552170 | 11/1956 | Italy .................................... 15/3.17 |
| 164729 | 9/1980 | Netherlands ........................ 15/3.17 |
| 1037574 | 7/1966 | United Kingdom ................. 15/3.14 |
| 258761 | 4/1970 | U.S.S.R. ............................. 15/3.17 |

Primary Examiner—Philip R. Coe
Assistant Examiner—Frankie L. Stinson
Attorney, Agent, or Firm—Frederick A. Zoda; John J. Kane

[57] ABSTRACT

An egg washing means including a plurality of cylindrical brushes being mounted with complete freedom of rotational movement and in being driven axially for lateral movement across a conveyor which carries eggs therebelow. The eggs are washed by cleaning fluid being sprayed upon the brushes which then contacts the egg surfaces for cleaning thereof. Spacing between the brushes is small enough that two adjacent brushes will contact the same egg at the same time causing a scrubbing-type action. Each cylindrical brush is mounted upon a rod which is driven for lateral movement across the path of egg movement by a cam attached with respect to the end of the rod. The end of the rod includes a cam follower having a generally U-shaped yoke member with a roller mounted therein. The roller contacts the cam face and follows the profile and lobe of the cam causing lateral movement of the cylindrical brushes. Also a follower spring is mounted between the yoke member and the mounting of the assembly for maintaining the roller in contact with the cam face. Downstream from the cylindrical brushes can be rotated a plurality of flat brushes which can be arranged in groups. These flat brushes include scalloped lower edges defining notches therein for cleaning a large portion of the surface of an egg.

13 Claims, 3 Drawing Figures

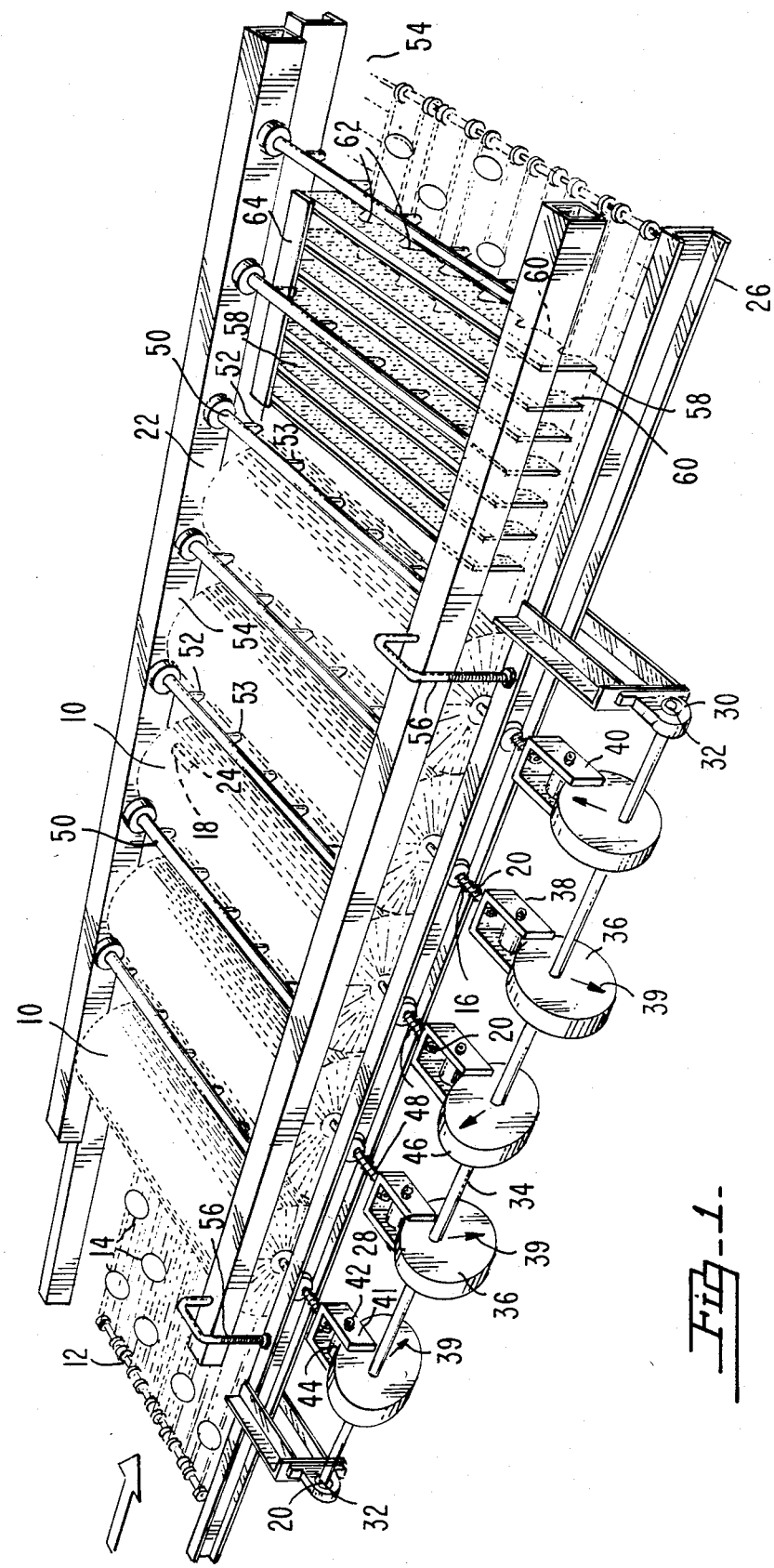

EGG CLEANING APPARATUS

BACKGROUND OF THE INVENTION

1. Field Of The Invention

The present invention deals with devices for cleaning of eggs traveling upon a conveyor means located therebelow. Eggs are carried through a plurality of stations for different steps of processing and the present invention provides a means for cleaning of the egg shells in their entirety. Other devices have been utilized using different types of brushes however the unique combination of brushes and brush movement shown in the present invention have not been shown heretofore.

2. Description Of The Prior Art

Other devices have been patented to achieve similar purposes such as U.S. Pat. No. 3,392,414 patented July 16, 1968 to J. C. Cathcart. In this patent the cylindrical rollers are power driven rather than the complete freedom of movement available in the present invention. Other pertinent patents include U.S. Pat. No. 3,349,419 patented Oct. 31, 1967 to H. Y. Kuhl P. R. Kuhl. This design does not utilize any type of cylindrical brushes but utilized non-scalloped flat brushes.

SUMMARY OF THE INVENTION

The present invention discloses an egg cleaning apparatus including an egg conveyor for carrying eggs longitudinally through a processing station. A plurality of cylindrical brushes preferably of silicon carbide are included extending laterally across the egg conveyor and positioned immediately above it. The lower portions of the cylindrical brushes are in contact with eggs traveling upon the egg conveyor therebelow.

A brush rod extends through each of the cylindrical brushes longitudinally or axially. The brush rods are completely free of any interconnection with the cylindrical brushes such that those brushes can have complete freedom of rotational movement about the brush rods. The brush rods also define a first rod end and a second rod end. A first mounting means extends longitudinally along one side of the egg conveyor and defines a plurality of rod apertures therethrough through which the first brush extend for holding of the cylindrical brushes in a position above the conveyor. That is the brush rods are mounted within the first rod aperture and thereby allow rotational and axial movement thereof.

A second mounting means extends longitudinally along the other side of the egg conveying means and defines a plurality of second rod apertures therein through which the second rod end of each of the brush rods extends for supporting the cylindrical brushes above the egg conveyor.

A cam supporting means for journal is fixedly secured with respect to said second mounting means and defines cam apertures therethrough. A camshaft extends through these apertures and is rotatably movable therein. A plurality of cams are located upon the camshaft means each of which includes a cam lobe or eccentric. Each of the cam means includes a cam face for contacting and driving the timing of lateral movement of the brush rods.

A cam follower means is secured with respect to the second rod end and prevents rotational movement of the brush rods by the construction thereof. This construction includes a yoke member having outwardly extending leg members positioned around both sides of the cam means adjacent to the second rod end. Also a roller rod extends between the leg members with a roller mounted thereon for complete freedom of rotational movement thereof. This roller will contact the cam face and will follow same. A follower spring extends about the second rod end between the yoke member and the second mounting means to urge the roller into continuous contact with respect to the face of the cam means and to act somewhat as a shock absorber to the lateral movement of the cylindrical brushes.

A plurality of fluid conduits will extend laterally across the egg conveyor means at a location above the cylindrical brushes and is adapted to carry cleaning fluids therethrough for dispensing therebelow. A plurality of outlets are located along the fluid conduits to achieve this dispensing and control of the flow can be achieved by nozzles being positioned within the outlets. Fluid is then dispensed downwardly onto the brushes positioned therebelow such that when the brushes contact the eggs traveling further therebelow the eggs will be cleaned.

Preferably the lobes of the cam are oriented in opposed relationship with respect to one another to reduce vibrations. For example if the particular unit includes four cylindrical brushes the lobes of the four cams on the camshaft will be at 90° with respect to one another to reduce vibrations. Furthermore having the cylindrical brushes out of time with respect to one another will cause a given egg to receive a scrubbing type action when it is being contacted by two brushes which are moving in the opposite direction.

Preferably the cylindrical brushes are of a silican carbide material to improve cleaning action upon the eggs.

A frame assembly is included supporting the conveyor means wherein the first mounting means and the second mounting means can be adjustably secured with respect thereto. In this manner wear of the outer surface of the cylindrical brushes or processing of different sizes of eggs can be achieved.

In certain systems it is advantageous to include an additional flat brush cleaning section having flat brushes positioned above the egg conveyor means in location to contact eggs traveling on the egg conveyor means and further positioned in a location downstream from the cylindrical brushes. These flat brush means include scalloped lower edges thereon which define a plurality of notches which are of a generally arcuate configuration and are positioned above the travel path of a given row of eggs therebelow to maximize cleaning of the egg surfaces. These flat brushes may be arranged in groups of perhaps seven such flat brushes which are spaced apart longitudinally with respect to one another by only approximately ¾". Fluid conduits for dispensing of cleaning fluids onto the brushes located therebelow will also be positioned above these flat brush sections.

It is an object of the present invention to provide an apparatus for cleaning eggs which cleans the entire outer surface of an egg.

It is an object of the present invention to provide an egg cleaning apparatus which cleans eggs with brushes contacting the external surface thereof wherein the brushes are moving in opposite directions to induce a scrubbing type movement.

It is an object of the present invention to provide an egg cleaning apparatus which minimizes vibrations caused by moving parts thereof.

It is an object of the present invention to provide an egg cleaning apparatus for the cleaning of eggs traveling upon an egg conveyor means located therebelow.

It is an object of the present invention to provide an egg cleaning apparatus wherein the distance between cylindrical rotating brushes and eggs traveling therebelow can be adjusted to account for brush wear or varied sizes in eggs.

It is an object of the present invention to provide an egg cleaning apparatus including cylindrical brushes which are not driven and that is are completely free for rotational movement such that they can be driven only by contact with the eggs themselves.

It is an object of the present invention to provide an egg cleaning apparatus including cylindrical brushes which are movable laterally with respect to the direction of egg conveyor movement and is driven by a separately positioned cam means.

It is an object of the present invention to provide an egg cleaning apparatus with laterally movable cylindrical brushes wherein the cylindrical brushes are attached with respect to a cam and include a roller means for following the cam profile to achieve careful and efficient control of the lateral cylindrical brush movement.

It is an object of the present invention to provide an egg cleaning apparatus including spring means for absorbing the shock of lateral movement of large cylindrical brushes used in such cleaning.

It is an object of the present invention to provide an egg cleaning apparatus which minimizes expense of operation.

It is an object of the present invention to provide an egg cleaning apparatus which requires a minimum amount of maintenance.

It is an object of the present invention to provide an egg cleaning apparatus which applies cleaning fluid directly to brushes which then apply the cleaning fluid to eggs located upon an egg conveyor means traveling therebelow.

It is an object of the present invention to provide an egg cleaning apparatus including flat brushes arranged in groups or banks of seven which include scalloped edges on a lower edge thereof to facilitate complete cleaning of eggs traveling therebelow.

It is an object of the present invention to provide an egg cleaning apparatus including banks of flat brushes wherein the brushes are spaced from one another by $\frac{3}{4}''$ or less.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a perspective view of an embodiment of the egg cleaning apparatus of the present invention;

DETAILED DESCRIPTION OF THE PREFERRED EMBODIMENT

Figure 3:
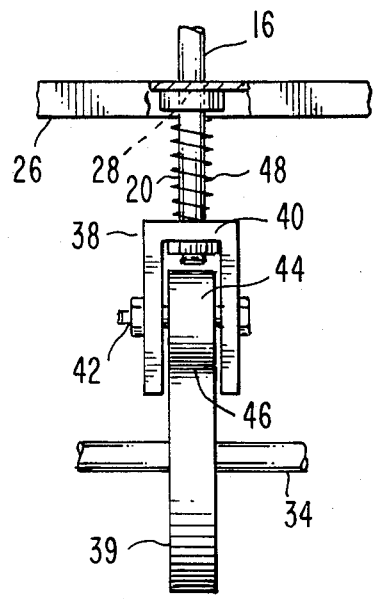
FIG. 3 is a top plan view of the embodiment shown in FIG. 2.
Figure 2:
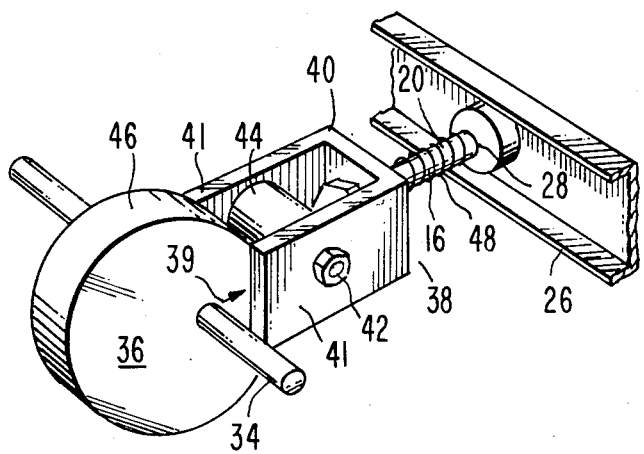
FIG. 2 is a perspective view of an embodiment of the cam follower means of the present invention.

An egg cleaning apparatus is shown in the present invention which includes a plurality of cylindrical brushes positioned extending transversely or laterally above an egg conveying means. The cylindrical brushes 10 are positioned close enough downwardly onto the egg conveying means 12 such that the outer surface of the cylindrical brushes 10 will contact eggs located on the conveying means 12. A plurality of such cylindrical brushes may be included within the given system. Preferably cylindrical brushes 10 are of silicon carbide.

Each of the cylindrical brushes is mounted upon a brush rod 16. The brush rod cannot rotate about the axis thereof due to an interlocking configuration with the cam and as such each of the rods is stationary except for axial movement thereof. The cylindrical brushes 10 are capable of full freedom of rotation about the axis down the center of the rod and will actually be caused to rotate by contact with the eggs therebelow. This rotation will increase friction between the brushes themselves and the eggs 14.

Each of the brush rods 16 includes a first rod end 18 and a second rod end 20 thereon. A first mounting means 22 extends laterally along one edge of the egg conveyor means and defines a plurality of first rod apertures 24 therein adapted to receive the first rod ends 18 of each brush rod 16.

A second mounting means 26 is positioned extending upon the opposite side of the egg conveying means 14 from the first mounting means 22. The second mounting means 26 defines a plurality of second rod apertures 28 therein each adapted to receive the second rod ends 20 extending therethrough. In this manner the brush rod 16 extending through the center of the cylindrical 10 will be maintained in a horizontal orientation with the first rod end 18 thereof extending through a first rod aperture 24 and with a second rod end 20 thereof extending through the second rod aperture 28.

A cam support means 30 is secured with respect to the second mounting means 26. This cam support means defines cam apertures 32 therein adapted to receive a camshaft means 34 extending therethrough.

Cam means 36 are located along the camshaft means 34 at each location adjacent to one of the second rod ends 20.

Each of the second rod ends includes a cam follower means 38 secured thereto. This cam follower means takes the form of a yoke member 40 of generally U-shaped configuration having leg members 41 extending outwardly therefrom to be positioned upon each opposite side of the given cam means 36 positioned adjacent to that second rod end. These leg members define apertures therein through which a roller rod 42 is positioned extending. Roller means 44 is positioned upon the roller rod to allow rotational movement of the roller. The roller is urged into contact with the cam face 46 of cam means 36 in order to carefully follow the profile and lobe means 39 thereof.

To facilitate this abutment between roller means 44 and cam face 46 a follower spring 48 is positioned about the second rod end 20 between the back face of the yoke member 40 and the second mounting means 26. This constant spring pressure will cause the roller means 44 to carefully follow and be maintained in contact constantly with the cam face 46.

A plurality of fluid conduits 50 are positioned extending laterally across the direction of movement of the egg conveyor means 12 at a position above cylindrical brushes 10 in such a manner as to dispense cleaning fluid downwardly onto the brushes. This dispensing is achieved by a plurality of outlets 52 having nozzles 53 therein to control such dispensing.

A frame assembly 54 is secured basically to the surrounding environmental structure and is movably secured with respect to the first and second mounting means such as by way of an adjustment means 56. In this manner modification of the adjustment means 56 will allow vertical movement of the cylindrical brushes with respect to the egg conveyor means 12 to allow vertical adjustment in case of wear of the cylindrical brushes or a change in size of the eggs being processed.

To facilitate cleaning a flat brush means 58 may be included positioned downstream of the cylindrical brushes in a position immediately above the egg conveyor means. This flat brush means may include a plurality of scalloped lower edges 60 defining notches 62 therein wherein the notches correspond to the path of travel of a given egg or row of eggs on the egg conveying means therebelow to facilitate cleaning of the upper egg surface as well as the side egg surfaces. It is often preferable to include several flat brush means 58 such as seven or more in a form of a flat brush grouping 64. With such groupings the flat brushes themselves are longitudinally spaced with respect to one another by as little as ¾" to achieve complete and efficient egg cleaning.

One of the main problems with cleaning mechanisms as shown in the present invention has been system vibration. To overcome this difficulty the present invention as shown in FIG. 1 is preferably positioned with the eccentric or lobe means of the cam in opposed relationship with respect to the lobe means on adjacent cams. For example as shown in FIG. 1 the far left cam is shown oriented in a downwardly direction whereas the next cam lobe is located in a directly upwardly direction being exactly out of phase or 180° out of phase responsive to rotation of the cam. Furthermore the third cam from the left is shown extending to the right and the fourth cam from the left is shown extending to the left and thereby are out of phase with respect to one another by 180° and out of phase with respect to the previous two cams by 90° each.

When the entire system of the present invention is used including both the cylindrical brushes and the flat brushes a variety of scrubbing and cleaning type actions on the egg surface is achieved. The flat brushes with the scalloped sections and the flat brushes with the non-scalloped sections as well as the cylindrical brushes being laterally movable and capable of rotational movement by contact with the eggs is a combination of cleaning action not shown or available heretofore by any prior art construction. This combination of cleaning achieves the new and unexpected result of a completely efficient cleaning system.

The springs which cause a close following of the cam profile by the roller means 44 also achieve a secondary residual benefit which is a shock absorber type action relating to the lateral movement of the cylindrical brushes 10. The normally violent lateral movement achieved by such camming action is overcome by this buffering or shock absorbing by these springs.

Also the brushes of the present invention that is both the cylindrical brushes 10 and the flat brushes 58 are basically self-cleaning in that the cleaning fluid is dispensed by the fluid conduits directly onto the brushes thereby cleaning the brushes themselves simultaneously with the applying of cleaning fluid to the brush for application to the eggs located therebelow.

A unique scrubbing on the egg surface is achieved by close spacing of the cylindrical brushes since two brushes will simultaneously contact the single egg and with the cam profile being out of phase with respect to one another for adjacent brushes it will cause one brush to be moving left to right and the other brush to be moving right to left on contacting the same egg thereby achieving a scrubbing-type cleaning action.

Also the lack of any requirements for rotational drive connection to the cylindrical brushes greatly increases brush wear and yet allows for full and complete efficiency of cleaning.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An egg cleaning apparatus comprising:
   (a) an egg conveying means for carrying eggs longitudinally through a processing station;
   (b) a plurality of cylindrical brushes extending laterally across said egg conveying means and positioned immediately thereabove with the lower portions thereof being in contact with the eggs located therebelow;
   (c) a plurality of brush rods each one extending longitudinally through one of said cylindrical brushes and allowing free rotational movement of said cylindrical brushes with respect to said brush rods, said brush rods including a first rod end and a second rod end thereof;
   (d) a first mounting means extending longitudinally along one side of said egg conveying means and defining a plurality of first rod apertures therein through which said first rod ends extend for suspending said cylindrical brushes in a position above said egg conveying means, said brush rods being mounted within said first rod apertures with laterally axial freedom of movement;
   (e) a second mounting means extending longitudinally along the other side of said egg conveying means and defining a plurality of second rod apertures therein through which the second rod end of each of said brush rods extend for suspending said cylindrical brushes in a position above said egg conveying means, said brush rods being mounted within said second rod aperture with laterally axial freedom of movement;
   (f) a cam support means fixedly secured with respect to said second mounting means and defining cam apertures therethrough;
   (g) a camshaft means rotatably mounted extending through said cam apertures of said cam support means to extend longitudinally along said second mounting means;
   (h) a plurality of cam means positioned on said camshaft means adjacent to each of said second rod ends extending through said second rod apertures;
   (i) a cam follower means secured to said second rod end and preventing rotational movement of said brush rods, said follower means including:
      (1) a yoke member including outwardly extending leg members positioned around both sides of said cam means adjacent to said second rod end;

(2) a roller rod extending between said leg members;

(3) a roller means mounted on said roller rod to allow rotational movement of said roller means, said roller means being in contact with the face of the adjacent cam with the profile of said cam means determining lateral movement of said cylindrical brush extending about said brush rod responsive to rotation of said cam means;

(j) a follower spring extending about said second rod end between said yoke member and said second mounting means to urge said roller into continuous contact with respect to the face of said cam means;

(k) a plurality of fluid conduits extending laterally across said egg conveying means at a location above said cylindrical brushes and being adapted to carry cleaning fluids therethrough; and (l) a plurality of outlets defined within said fluid conduits to facilitate dispensing of cleaning fluids onto the cylindrical brushes positioned therebelow.

2. The apparatus as defined in claim 1 wherein each of said cam means includes lobe means to urge lateral movement of said brush rods and said cylindrical brushes.

3. The apparatus as defined in claim 2 wherein said lobe means are oriented in opposed relation with respect to one another to reduce vibrations.

4. The apparatus as defined in claim 2 wherein said cylindrical brushes are spaced close enough with respect to one another for two adjacent of said cylindrical brushes to be capable of both simultaneously contacting a single egg traveling on said egg conveying means therebelow.

5. The apparatus as defined in claim 4 wherein said lobe means are oriented in opposed relation with respect to one another to induce scrubbing cleaning of simultaneously contacted eggs.

6. The apparatus as defined in claim 1 wherein the cylindrical brushes are made of silicon carbide.

7. The apparatus as defined in claim 1 further including a frame assembly supporting said conveyor means and wherein said first mounting means and said second mounting means are adjustably secured with respect to said frame assembly.

8. The apparatus as defined in claim 1 further including nozzles selectively positioned within said outlet to control dispensing of cleaning fluid onto said cylindrical brushes.

9. The apparatus as defined in claim 1 further including a flat brush means positioned above said egg conveying means in location to contact eggs traveling on said egg conveying means therebelow and further positioned downstream from said cylindrical brushes, said flat brush means including a scalloped lower edge thereon defining a plurality of notches therein each one being generally arcuate and positioned above the travel path of a given egg therebelow to maximize cleaning of the surface of the egg.

10. The apparatus as defined in claim 9 wherein said flat brush means are arranged into at least one flat brushing grouping of seven such brushes each being longitudinally separated with respect to one another by approximately $\frac{3}{4}''$.

11. The apparatus as defined in claim 9 wherein said fluid conduits extend laterally across said egg conveying means also above said flat brush means for spraying cleaning fluid onto said flat brush means.

12. An egg cleaning apparatus comprising:

(a) an egg conveying means for carrying eggs longitudinally through a processing station;

(b) a plurality of cylindrical brushes of silicon carbide extending laterally across said egg conveying means and positioned immediately thereabove with the lower portions thereof being in contact with the eggs located therebelow, said cylindrical brushes being spaced close enough with respect to one another for two adjacent of said cylindrical brushes to be capable of both simultaneously contacting a single egg traveling on said egg conveying means therebelow;

(c) a plurality of brush rods each one extending longitudinally through one of said cylindrical brushes and allowing free rotational movement of said cylindrical brushes with respect to said brush rods, said brush rods including a first rod end and a second rod end thereof;

(d) a first mounting means extending longitudinally along one side of said egg conveying means and defining a plurality of first rod apertures therein through which said first rod ends extend for suspending said cylindrical brushes in a position above said egg conveying means, said brush rods being mounted within said first rod apertures with laterally axial freedom of movement;

(e) a second mounting means extending longitudinally along the other side of said egg conveying means and defining a plurality of second rod apertures therein through which the second rod end of each of said brush rods extend for suspending said cylindrical brushes in a position above said egg conveying means, said brush rods being mounted within said second rod aperture with laterally axial freedom of movement;

(f) a cam support means fixedly secured with respect to said second mounting means and defining cam apertures therethrough;

(g) a camshaft means rotatably mounted extending through said cam apertures of said cam support means to extend longitudinally along said second mounting means;

(h) a plurality of cam means positioned on said camshaft means adjacent to each of said second rod ends extending through said second rod apertures, each of said cam means including a lobe means to urge lateral movement of said brush rods and said cylindrical brushes, said lobe means being oriented in opposed relationship with respect to one another to reduce vibrations and to induce scrubbing cleaning of simultaneously contacted eggs;

(i) a cam follower means secured to said second rod end and preventing rotational movement of said brush rods, said follower means including:

(1) a yoke member including outwardly extending leg members positioned around both sides of said cam means adjacent to said second rod end;

(2) a roller rod extending between said leg members;

(3) a roller means mounted on said roller rod to allow rotational movement of said roller means, said roller means being in contact with the face of the adjacent cam with the profile of said cam means determining lateral movement of said cylindrical brush extending about said brush rod responsive to rotation of said cam means;

(j) a follower spring extending about said second rod end between said yoke member and said second mounting means to urge said roller into continuous contact with respect to the face of said cam means;

(k) a plurality of fluid conduits extending laterally across said egg conveying means at a location above said cylindrical brushes and being adapted to carry cleaning fluids therethrough;

(l) nozzles selectively positioned within said outlets to control dispensing of cleaning fluid onto said cylindrical brushes;

(m) a plurality of outlets defined within said fluid conduits to facilitate dispensing of cleaning fluids onto the cylindrical brushes positioned therebelow; and (n) a frame assembly supporting said conveyor means and wherein said first mounting means and said second mounting means are adjustably secured with respect to said frame assembly.

13. An egg cleaning apparatus comprising:

(a) an egg conveying means for carrying eggs longitudinally through a processing station;

(b) a plurality of cylindrical brushes of silicon carbide extending laterally across said egg conveying means and positioned immediately thereabove with the lower portions thereof being in contact with the eggs located therebelow, said cylindrical brushes being spaced close enough with respect to one another for two adjacent of said cylindrical brushes to be capable of both simultaneously contacting a single egg traveling on said egg conveying means therebelow;

(c) a plurality of brush rods each one extending longitudinally through one of said cylindrical brushes and allowing free rotational movement of said cylindrical brushes with respect to said brush rods, said brush rods including a first rod end and a second rod end thereof;

(d) a first mounting means extending longitudinally along one side of said egg conveying means and defining a plurality of first rod apertures therein through which said first rod ends extend for suspending said cylindrical brushes in a position above said egg conveying means, said brush rods being mounted within said first rod apertures with laterally axial freedom of movement;

(e) a second mounting means extending longitudinally along the other side of said egg conveying means and defining a plurality of second rod apertures therein through which the second rod end of each of said brush rods extend for suspending said cylindrical brushes in a position above said egg conveying means, said brush rods being mounted within said second rod aperture with laterally axial freedom of movement;

(f) a cam support means fixedly secured with respect to said second mounting means and defining cam apertures therethrough;

(g) a camshaft means rotatably mounted extending through said cam apertures of said cam support means to extend longitudinally along said second mounting means;

(h) a plurality of cam means positioned on said camshaft means adjacent to each of said second rod ends extending through said second rod apertures, each of said cam means including a lobe means to urge lateral movement of said brush rods and said cylindrical brushes, said lobe means being oriented in opposed relationship with respect to one another to reduce vibrations and to induce scrubbing cleaning of simultaneously contacted eggs;

(i) a cam follower means secured to said second rod end and preventing rotational movement of said brush rods, said follower means including:
  (1) a yoke member including outwardly extending leg members positioned around both sides of said cam means adjacent to said second rod end;
  (2) a roller rod extending between said leg members;
  (3) a roller means mounted on said roller rod to allow rotational movement of said roller means, said roller means being in contact with the face of the adjacent cam with the profile of said cam means determining lateral movement of said cylindrical brush extending about said brush rod responsive to rotation of said cam means;

(j) a follower spring extending about said second rod end between said yoke member and said second mounting means to urge said roller into continuous contact with respect to the face of said cam means;

(k) a plurality of fluid conduits extending laterally across said egg conveying means at a location above said cylindrical brushes and being adapted to carry cleaning fluids therethrough;

(l) nozzles selectively positioned within said outlets to control dispensing of cleaning fluid onto said cylindrical brushes;

(m) a plurality of outlets defined within said fluid conduits to facilitate dispensing of cleaning fluids onto the cylindrical brushes positioned therebelow;

(n) a frame assembly supporting said conveyor means and wherein said first mounting means and said second mounting means are adjustably secured with respect to said frame assembly; and (o) a flat brush means positioned above said egg conveying means in location to contact eggs traveling on said egg conveying means therebelow and further positioned downstream from said cylindrical brushes, said flat brush means including a scalloped lower edge thereon to define a plurality of notches therein each one being generally arcuate and positioned above the travel path of a given egg therebelow to maximize cleaning of the surface of the egg, the flat brush means being arranged into at least one flat brushing grouping of seven such brushes with each being longitudinally separated with respect to one another by approximately $\frac{3}{4}''$, said fluid conduits extending laterally across said egg conveying means and also above said flat brush means for spraying cleaning fluid onto said flat brush means.

* * * * *